United States Patent [19]

Sawada

[11] Patent Number: 4,939,774

[45] Date of Patent: Jul. 3, 1990

[54] METHOD FOR CONTROLLING A DIGITAL TELEPHONE SET AND A TELEPHONE SET BASED ON THE SAME

[75] Inventor: Mitsuji Sawada, Tokyo, Japan

[73] Assignee: Ricoh Company, Ltd., Tokyo, Japan

[21] Appl. No.: 376,996

[22] Filed: Jul. 7, 1989

[30] Foreign Application Priority Data

Jul. 11, 1988 [JP] Japan .................................. 63-170808

[51] Int. Cl.$^5$ ............................................ H04M 1/26
[52] U.S. Cl. ................................... 379/353; 379/237; 379/387
[58] Field of Search ............... 379/283, 282, 280, 284, 379/222, 235, 236, 352, 353, 354, 237, 387

[56] References Cited

U.S. PATENT DOCUMENTS 4,613,730 9/1986 Fechalos et al. ..................... 379/355

Primary Examiner—James L. Dwyer
Attorney, Agent, or Firm—Oblon, Spivak, McClelland, Maier & Neustadt

[57] ABSTRACT

A method for controlling a digital telephone set coupled to an integrated services digital network, includes the following procedure. It is determined whether a telephone number of a destination terminal which is given by sequentially inputting digits forming said destination telephone number, includes an area code. Then the procedure identifies a total number of digits forming a telephone number related to said area code by searching a table in which a total number of digits forming a telephone number related to each of different area codes is defined. Then a first message requesting for setting up a call to said destination terminal is output when a number of digits forming said destination telephone number which has been input up to now becomes equal to said total number of digits fomring a telephone number related to said area code included in said destination telephone number. Alternatively, a second message is output when it is determined that said destination telephone number does not include any area code and when an interval between consecutive digits included in said destination telephone number exceeds a predetermined interval.

14 Claims, 5 Drawing Sheets

FIG. 6

| PROTOCOL IDENTIFIER |
| --- |
| CALL NUMBER |
| MESSAGE TYPE |
| TRANSMISSION ABILITY |
| CALL NUMBER |
| DESTINATION NUMBER |

METHOD FOR CONTROLLING A DIGITAL TELEPHONE SET AND A TELEPHONE SET BASED ON THE SAME

BACKGROUND OF THE INVENTION

The present invention generally relates to a method for controlling a digital telephone set and a telephone set based on the same, and particularly to a method for controlling a digital telephone set which uses an integrated services digital network as a transmission line and a telephone set based on the method.

Recently, there has been considerable activity in the development of an integrated services digital network (hereinafter simply referred to as an ISDN). Currently, terminal equipments for an ISDN, such as a digital telephone set have been put to practical use. An ISDN will take place of a public services telephone network (hereinafter simply referred to as a PSTN) in the feature. However, both ISDN and PSTN will be used until an ISDN is completely substituted for the PSTN. In order to construct a network including both the ISDN and PSTN, internetworking has been proposed, which enables it to be possible to exchange data between the ISDN and PSTN.

FIG.1 illustrates a basic transmission control procedure which is to be executed when an ISDN is used. In the illustrated procedure, a digital telephone set is used. An operator related to a caller (source) terminal takes off a handset of a digital telephone set, and inputs the telephone number of a destination terminal. Then the source terminal sends a call set-up message SETUP to an ISDN to thereby request to set up a call for the destination terminal. The ISDN sends the designated destination terminal the call set-up message SETUP. Thereby, the destination terminal is called out. Further, the ISDN sends the source terminal a call set-up accepted message CALL PROC used for letting the source terminal know a call set-up state.

When the destination terminal receives the call set-up message SETUP, it starts ringing a buzzer in order to let an operator related to the destination terminal know the arrival of a call. At the same time, the destination terminal sends the ISDN a call message ALERT which lets the source terminal know that the destination terminal has started ringing. Thereby, the source terminal starts outputting a calling indication by outputting a ringing tone through the handset, for example.

When the operator related to the destination terminal takes off the handset, the destination terminal sends the ISDN an answer message or connection message CONN. Correspondingly, the ISDN sends the source terminal the answer message CONN to thereby let the source terminal know that the destination terminal accepts the call. Thereby, the source terminal stops outputting the calling indication.

The ISDN sends the destination terminal an answer confirmation message or a connection acknowledgement CONN ACK. At this time, an information channel for data transfer is established between the source and destination terminals. Thereby, the operators of the source and destination terminals can communicate with each other.

When speech ends and the operator related to the source terminal puts back the handset, for example, the source terminal sends the ISDN a disconnection message DISC in order to request a release of the information channel. The ISDN sends the destination terminal the disconnection message DISC for letting the destination terminal know the release of the information channel. Thereby, the destination terminal sends back the ISDN a release message REL for letting the source terminal know that the channel disconnection is completed. The ISDN sends the source terminal the release message REL. At this time, the destination terminal outputs an indication showing the end of speech through a display unit provided in the destination digital telephone set in order to let the operator know that the information channel is disconnected.

When the channel release is completed, the source terminal sends the ISDN a release completion message REL COMP. Then, the ISDN sends the destination terminal the release completion message REL COMP, and then the release of the information channel is completed. Hence, the information channel established between the source and destination terminals is completely released, and the line returns to the idle state. The line disconnection may be requested by the destination terminal.

In this manner, the information channel is established between the source and destination terminals, and is then released from the connection state.

It is noted that there is proposed an ISDN which accepts all the digits of the destination telephone number together at one time in order to set up a call. The call set-up procedure related to this case is especially called a batch call set-up procedure. An ISDN based on this procedure cannot operate when the digits of the destination telephone number are sequentially supplied thereto. Conventionally, when a call is set up for an ISDN based on the batch call set-up procedure, the operator related to a source terminal inputs all the digits of the destination telephone number, and thereafter gives the source terminal a specific instruction for having the source terminal start the call set-up operation.

On the other hand, in the conventional PSTN, the operator related to a source terminal (an analog telephone set) inputs the destination telephone number for every digit when setting up a call. Therefore, two different call set-up procedures must be provided, and suitable one of the procedures must be selected depending on the type of the connected ISDN. This is very troublesome.

SUMMARY OF THE INVENTION

It is therefore a general object of the present invention to provide an improved method for controlling a digital telephone set and a digital telephone set based on the same.

A more specific object of the present invention is to provide a method for control a digital telephone set capable of setting up a call in the same way as a conventional analog telephone set, and to provide a digital telephone set based on the same.

The above mentioned objects of the present invention can be achieved by a method for controlling a digital telephone set coupled to an integrated services digital network, comprising the steps of determining whether a telephone number of a destination terminal which is given by sequentially inputting digits forming the destination telephone number, includes an area code; identifying a total number of digits forming a telephone number related to the area code by searching a table in which a total number of digits forming a telephone number related to each of different area codes is defined; outputting a first message requesting for setting up a call to the destination terminal when the number of digits forming the destination telephone number which has been input up to now becomes equal to the total number of digits forming a telephone number related to the area code included in the destination telephone number, the first message being formed based on the destination telephone number which has been input up to now; and outputting a second message requesting for setting up a call to the destination terminal when it is determined that the destination telephone number does not include any area code and when the interval between consecutive digits included in the destination telephone number exceeds a predetermined interval, the second message being formed based on the destination telephone number which has been input up to now.

The above-mentioned objects of the present invention can also be achieved by a digital telephone set coupled to an integrated services digital network, comprising a receiver and a transmitter; first means for inputting a telephone number of a destination terminal by sequentially inputting digits of the destination telephone number; second means, coupled to the receiver and the transmitter, for communicating with the integrated services digital network; third means, coupled to the first means, for determining whether the telephone number of the destination terminal includes an area code; fourth means for storing a total number of digits of a telephone number related to each of different area codes; fifth means, coupled to the fourth means, for identifying a total number of digits forming a telephone number related to the area code by searching the fourth means; sixth means, coupled to the fourth and fifth means, for outputting a first message requesting for setting up a call to the destination terminal when the number of digits forming the destination telephone number which has been input up to now becomes equal to the total number of digits forming a telephone number related to the area code included in the destination telephone number, the first message being formed based on the destination telephone number which has been input up to now; and seventh means, coupled to the fourth and fifth means, for outputting a second message requesting for setting up a call to the destination terminal the when it is determined that the destination telephone number does not include any area code and when the interval between consecutive digits included in the destination telephone number exceeds a predetermined interval, the second message being formed based on the destination telephone number which has been input up to now.

Other objects, features and advantages of the present invention will become apparent from the following detained description when read in conjunction with the accompanying drawings.

BRIEF DESCRIPTION OF THE DRAWINGS

FIG.6 is a view showing an example of a call set-up message.

DESCRIPTION OF THE PREFERRED EMBODIMENT

Figure 1:
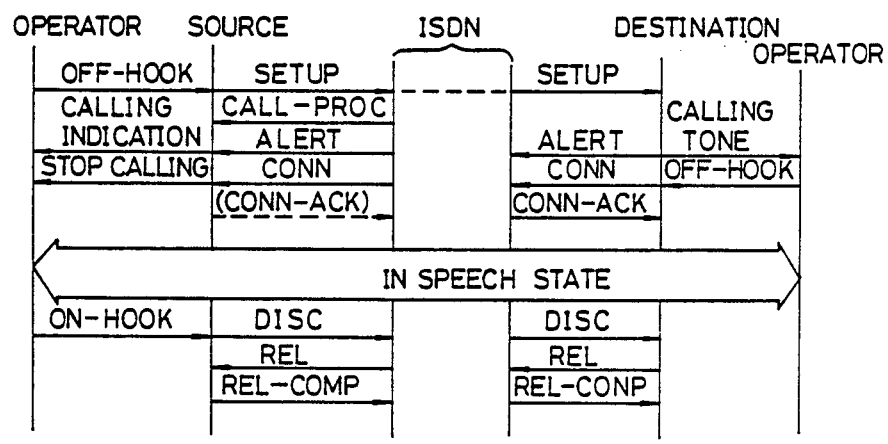
FIG.1 is a view illustrating a basic transmission control procedure in an ISDN.
Figure 2:
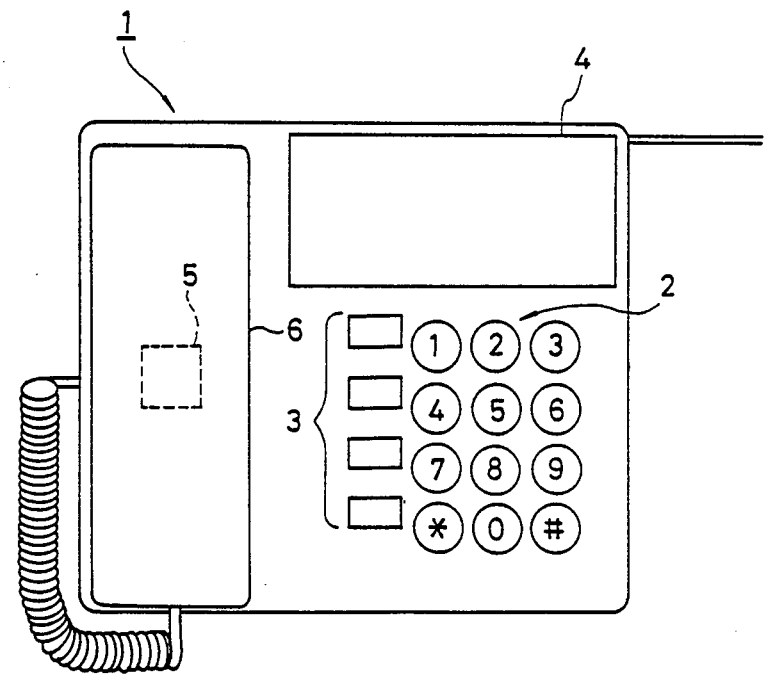
FIG.2 is a plan view of a digital telephone set of an embodiment/ of the present invention.

A description is given of a preferred embodiment of the present invention. FIG.2 shows an external appearance of a digital telephone set of a preferred embodiment of the present invention. Referring to FIG.2, a digital telephone set 1 includes the following structural elements. A ten key 2 is used for inputting numeric data such as a telephone number. A group of functional keys 3 is used for selecting various available functions. A display 4 is used for displaying the telephone number which is input through the ten key 2, and character information such as various guidance messages. A buzzer 5 is used for generating a ringing tone indicative of the arrival of a call. A handset 6 includes a receiver and a transmitter.

Figure 3:
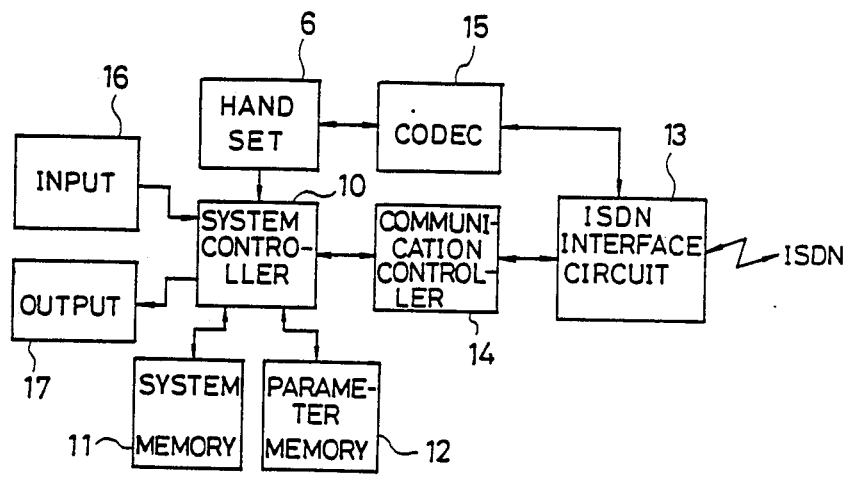
FIG.3 is a block diagram of a control system installed in the digital telephone set shown in FIG.2.

Referring to FIG.3, there is illustrated a control system provided in the digital telephone set 1 shown in FIG.2. Referring to FIG.3, a system controller 10 controls the entire control system in a manner described later. A system memory 11 is connected to the system controller 10, and stores programs necessary for a control process executed by the system controller 10, and various tables. A parameter memory 12, which is connected to the system controller 10, stores various parameters necessary for the control process by the system controller 10. An ISDN interface circuit 13 is used for executing protocols related to up to layer 3 (network layer) which defines an ISDN line control. As is well known, a layer structure consisting of 7 layers is recommended by CCITT (Comite Consultif International Telegraphique et Telephonique). Layer 1 is a physical layer, layer 2 is a data link layer, and layer 3 is a network layer. Layer 4 is a transport layer, layer 5 is a session layer, layer 6 is a presentation layer, and layer 7 is an application layer.

A communication controller 14 is interposed between the system controller 10 and the ISDN interface circuit 13, and executes protocols related to layer 4 and higher layers. Further, the communication controller 14 cooperates with the system controller 10 and the ISDN interface circuit 13 so as to execute the communication procedure for the digital telephone set 1.

A coder/decoder (CODEC) 15 converts an analog signal supplied from the handset 6 into a digital signal. The ISDN (not shown in FIG.3) handles signals in digital form. Further, the coder/decoder 15 converts a digital signal supplied from the ISDN into an analog signal. The ISDN interface circuit 13 has a digital signal input/output terminal which is coupled to an information channel input/output terminal provided on the terminal side of the ISDN.

An input circuit 16 is connected to the system controller 10, and is made up of the ten key 2 and the group of functional keys 3. An output circuit 17 is connected to the system controller 10, and is made up of the display 4 and the buzzer 5. The state of a hook switch (not shown) which indicates the position thereof, is supplied to the system controller 10.

Figure 4:
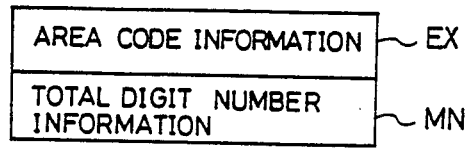
FIG.4 is a view illustrating an element provided in an area code total digit number table used in the embodiment.

Referring to FIG.4, there is illustrated an element in an area code total digit number table formed in the parameter memory 12. Hereinafter, the area code total digit number table is simply referred to as a table. An element includes area code information EX indicative of an area code, and total digit number information MN indicating the total number of digits of the telephone number related to the area code defined by the area code information EX. The table includes the above-mentioned element for each of all different area codes.

Figure 5:
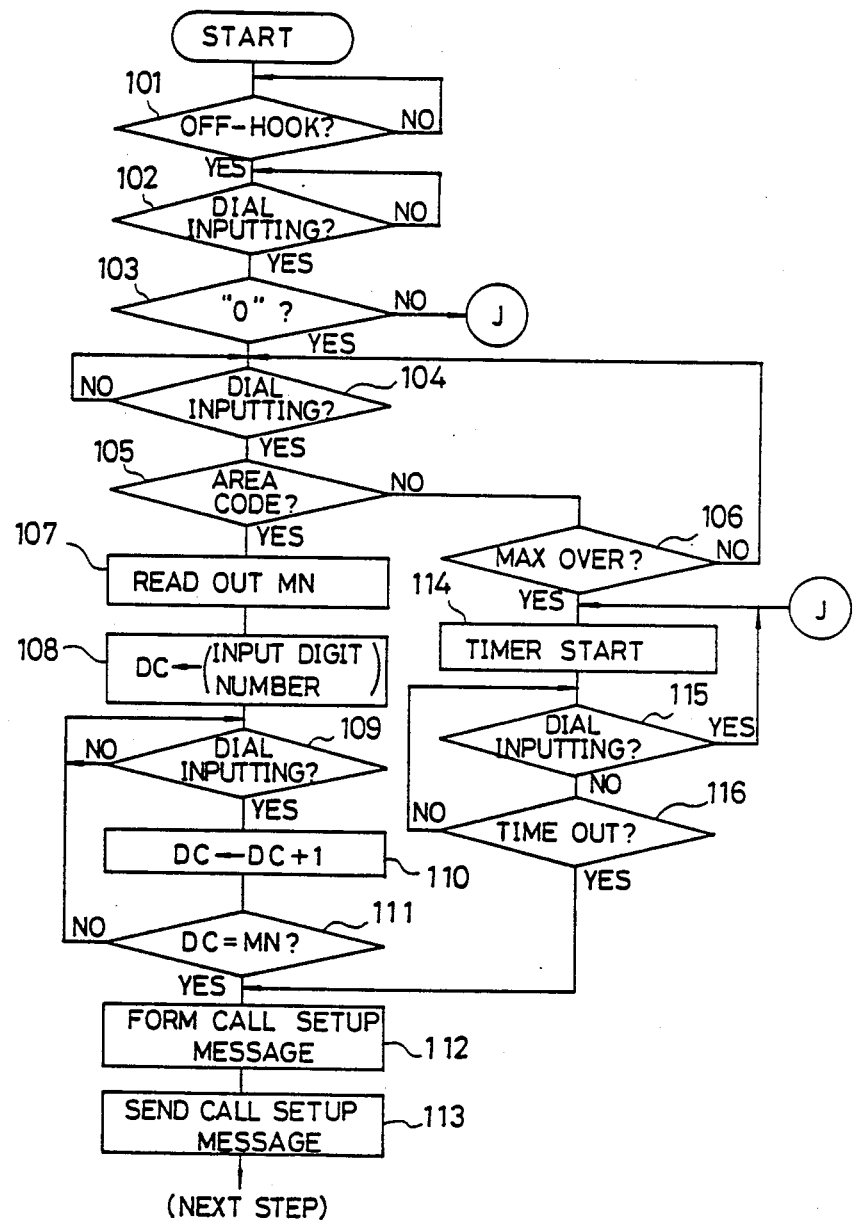
FIG.5 is a flowchart showing an operation of the embodiment at the time of setting up a call.

A description is given of a control procedure for the digital telephone set 1 with reference to FIG.5. It is now assumed that the area code used in the ISDN starts with 0 in the same manner as the area code used in a conventional PSTN. Referring to FIG.5, the system controller 10 always checks whether an operator takes off the handset 6, or in other words, the hook switch is changed to the offhook state (a NO loop related to step 101). When the result in step 101 becomes YES, the system controller 10 checks whether the operator inputs a destination telephone number through the ten key 2 (a NO loop related to step 102). When the operator inputs the first digit of the destination telephone number and the result in step 102 becomes YES, the system controller 10 stores the first digit in a predetermined working area (hereinafter referred to a key data area) formed in the system memory 11. Further, the system controller 11 discerns whether the input first digit is a numeral '0'(step 103).

When the result in step 103 is YES, the input destination telephone number includes an area code. Then the system controller 10 waits for the next dial input (a NO loop related to step 104). When the result in step 104 becomes YES, the input key data or dial digit (the second digit in this case) is written into the key data area in addition to the first digit. Then the system controller 10 determines whether a sequence of the digits which has sequentially been written into the key data area coincides with any of the area codes stored in the parameter memory 12 (step 105). This is done by searching the area code information EX defined in the table stored in the parameter memory 12.

When the result in step 105 is NO, the system controller 10 discerns whether the number of digits which has been input up to now exceeds a maximum number of digits forming area codes stored in the parameter memory 12 (step 106). When the result in step 106 is YES, the system controller 10 waits for the next digit input, or in other words, the procedure returns to step 104.

On the other hand, when the result in step 105 is YES, the system controller 10 reads the total digit number information MN related to the input area code from the table stored in the parameter memory 12 (step 107). Then the system controller 10 sets the number of digits input up to now to a digit number counter DC, which is a program counter provided in the system controller 10 (step 108). Thereafter, the system controller 10 monitors the subsequent dial input (a NO loop related to step 109). When the next dial input is detected in step 109, the system controller 10 adds the input dial digit to the prior digits stored in the key data area, and increments the digit number counter DC by +1 (step 110). Then the system controller 10 determines whether the counted value in the digit number counter DC corresponds to the total digit number information MN related to the identified area code (step 111). When the result in step 111 is NO, the procedure returns to step 109 so that the system controller 1 waits for the next digit input.

On the other hand, when the result in step 111 is YES, the operator has input all the digit of the destination telephone number. Then, the communication controller 14 assembles the format of the call set-up message SETUP by using, as the destination telephone number, all the digits stored in the key data area (step 112). Then the ISDN interface circuit 13 sends the the call set-up message to the ISDN.

When the operator inputs only a local telephone number (not having any area code), the result in step 103 is NO. In this case, the system controller 10 starts a digit-to-digit timer provided therein (step 114), which is used for determining whether the interval between two consecutive digits exceeds a predetermined interval. Hereinafter, the digit-to-digit timer is simply referred to as a timer. The counter overflows when the interval between two consecutive digits of concern exceeds the predetermined interval. The system controller 10 checks whether the next digit is input until the timer overflows (a NO loop related to steps 115 and 116).

When the next dial input is done until the timer overflows (that is, the result in step 115 is YES), the system controller 10 adds the present digit input of concern to the prior digits stored in the key data area, and provides for the next digit inputting. That is, the procedure returns to step 114. After the key inputting by the operator ends, the timer will automatically overflows so that the result in step 116 becomes YES. Then the procedure proceeds to step 112 where the call set-up message SETUP is formed by the communication controller 14 (step 112), and is sent to the ISDN through the ISDN interface circuit 13 (step 113). When the area code input by key operation exceeds the maximum number of digits forming the area codes, and therefore the result in step 106 becomes YES, the procedure proceeds to step 114.

The above-mentioned operation is summarized as follows. When the operator inputs the destination telephone number including the area code, the source terminal calls out the destination terminal at the time when the operator inputs the number of digits equal to the total number of digits of the destination telephone number related to the area code input by the key operation. On the other hand, when the operator inputs only the local telephone number, the source terminal calls out the destination terminal at the time when the operator inputs all the digits of the destination telephone number and the timer overflows. As a result, the operator calls out a desired destination by the same key input operation irrespective of the type of the networks. Therefore the operator is released from the specific key operation.

For example, the timer is designed to overflow when 5 to 10 seconds pass after started. This time is adjusted by the operator through the input circuit 16 (FIG.3).

FIG.6 shows an example of the format of the call set-up message SETUP. The call set-up message SETUP is made up of a common part and an individual part. The common part is composed of a protocol identifier, a call number and a message type. The individual part is composed of a transmission ability, a source number and a destination number. The transmission ability is an indispensable information element, and the source and destination numbers are additional information elements.

The protocol identifier is used for specifying a protocol specification which defines call control messages related to the layer 3. The protocol specification includes information on format and sequence. The call number is used for specifying which one of the calls associated with the message. The message type represents the contents of respective messages. The transmission ability defines an information transfer ability, a transfer mode, an information transfer rate, information indicative of the information transfer style, and information indicative of a protocol of use's information. The information element indicative of the information transfer ability represents the contents of the information to be transmitted, by selecting any from among an audio, non-limited digital information, limited digital information, 3.1 kHz audio, 7 kHz audio, and video. The transfer mode indicates whether the used exchange is a line exchange or a packet exchange. The source number represents the telephone number (ISDN address) of the source terminal, and the destination number represents the telephone number of the destination terminal.

In step 112, the communication controller 14 forms the call set-up message SETUP based on the destination telephone number supplied by the system controller 10, and transfers the formed call set-up message SETUP to the ISDN interface circuit 13. Thereby, in step 113, the ISDN interface circuit 13 converts the transferred call set-up message SETUP into a line exchange signal in conformity to a predetermined signal format. Then the line exchange signal is sent to the ISDN through the signal channel.

In step 103, the digit to be discriminated is not limited to '0'. It depends on design of area codes. The above-mentioned procedure and structure can be applied to an ISDN which uses the batch call set-up procedure and a divided call set-up procedure employed for conventional PSTNs. In the structure shown in FIG.3, the system controller 10 and the communication controller 14 may be formed as one element such as a central processing unit.

The present invention is not limited to the above-mentioned embodiment, and variations and modifications may be made without departing from the scope of the present invention.

What is claimed is:

1. A method for controlling a digital telephone set coupled to an integrated services digital network, comprising the steps of:
   determining whether a telephone number of a destination terminal which is given by sequentially inputting digits forming said destination telephone number, includes an area code;
   identifying a total number of digits forming a telephone number related to said area code by searching a table in which a total number of digits forming a telephone number related to each of different area codes is defined;
   outputting a first message requesting for setting up a call to said destination terminal when the number of digits forming said destination telephone number which has been input up to now becomes equal to said total number of digits forming a telephone number related to said area code included in said destination telephone number, said first message being formed based on said destination telephone number which has been input up to now; and
   outputting a second message requesting for setting up a call to said destination terminal when it is determined that said destination telephone number does not include any area code and when the interval between consecutive digits included in said destination telephone number exceeds a predetermined interval, said second message being formed based on said destination telephone number which has been input up to now.

2. A method for controlling a digital telephone set as claimed in claim 1, wherein said determining step comprises the steps of:
   discriminating whether said destination telephone number includes a specific digit positioned at top thereof inherent in said different area codes; and
   determining whether consecutive digits which are included in said destination telephone number and start with said specific digit, coincide with any of said different area codes.

3. A method for controlling a digital telephone set as claimed in claim 1, wherein said step of outputting a first message comprises the steps of:
   counting the number of digits which are sequentially input; and
   determining whether the number of digits forming said destination telephone number which as been input up to now becomes equal to said total number of digits forming a telephone number related to said area code included in said destination telephone number.

4. A method for controlling a digital telephone set as claimed in claim 3, wherein said counting step comprises the steps of:
   setting the number of digits forming said area code included in said destination telephone number as an initial value; and
   incrementing the counted value by +1 from said initial value each time a digit following said area code is input.

5. A method for controlling a digital telephone set as claimed in claim 1, wherein the step of outputting said second message comprises the steps of:
   measuring the interval between said consecutive digits by using a timer, which starts operating each time one digit is input and overflows after the lapse of a time equal to said predetermined interval; and
   determining whether said timer overflows, said second message being output when said timer overflows.

6. A method of controlling a digital telephone set as claimed in claim 5, wherein said step of outputting said second message comprises the steps of:
   discerning whether the number of digits which have been input up to now exceeds a maximum number of digits of said different area codes; and
   starting said timer when one subsequent digit included in said destination telephone number is input.

7. A method for controlling a digital telephone set as claimed in claim 4, wherein said predetermined interval is set equal to 5 to 10 milliseconds.

8. A digital telephone set coupled to an integrated services digital network, comprising:
   a receiver and a transmitter;
   first means for inputting a telephone number of a destination terminal by sequentially inputting digits of said destination telephone number;
   second means, coupled to said receiver and said transmitter, for communicating with said integrated services digital network;
   third means, coupled to said first means, for determining whether said telephone number of the destination terminal includes an area code;
   fourth means for storing a total number of digits of a telephone number related to each of different area codes;

fifth means, coupled to said fourth means, for identifying a total number of digits forming a telephone number related to said area code by searching said fourth means;

sixth means, coupled to said fourth and fifth means, for outputting a first message requesting for setting up a call to said destination terminal when the number of digits forming said destination telephone number which has been input up to now becomes equal to said total number of digits forming a telephone number related to said area code included in said destination telephone number, said first message being formed based on said destination telephone number which has been input up to now; and seventh means, coupled to said fourth and fifth means, for outputting a second message requesting for setting up a call to said destination terminal said when it is determined that said destination telephone number does not include any area code and when the interval between consecutive digits included in said destination telephone number exceeds a predetermined interval, said second message being formed based on said destination telephone number which has been input up to now.

9. A digital telephone set as claimed in claim 8, wherein said third means comprises:

means for discriminating whether said destination telephone number includes a specific digit positioned at top thereof inherent in said different area codes; and means for determining whether consecutive digits which are included in said destination telephone number and start with said specific digit, coincide with any of said different area codes.

10. A digital telephone set as claimed in claim 8, wherein said sixth means comprises:

means for counting the number of digits which are sequentially input; and means for determining whether the number of digits forming said destination telephone number which as been input up to now becomes equal to said total number of digits forming a telephone number related to said area code included in said destination telephone number.

11. A digital telephone set as claimed in claim 10, wherein said means for counting comprises:

means for setting the number of digits forming said area code included in said destination telephone number as an initial value; and means for incrementing the counted value by +1 from said initial value each time a digit following said area code is input.

12. A digital telephone set as claimed in claim 8, wherein said seventh means comprises:

means for measuring the interval between said consecutive digits by using a timer, which starts operating each time one digit is input and overflows after the lapse of a time equal to said predetermined interval; and means for determining whether said timer overflows, said second message being output when said timer overflows.

13. A digital telephone set as claimed in claim 12, wherein said seventh means comprises:

means for discerning whether the number of digits which have been input up to now exceeds a maximum number of digits of said different area codes; and means for starting said counter when one subsequent digit included in said destination telephone number is input.

14. A digital telephone set as claimed in claim 12, wherein said predetermined interval is set equal to 5 to 10 milliseconds.

* * * * *